US012810511B2

(12) United States Patent
Xiong

(10) Patent No.: US 12,810,511 B2
(45) Date of Patent: Nov. 24, 2026

(54) FINAL VIEW FRAME GENERATION WITH DYNAMIC REGIONAL PLANE RECONSTRUCTION AND EXTRACTION

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/098,744

(22) Filed: Apr. 2, 2025

(65) Prior Publication Data

US 2026/0220845 A1 Jul. 30, 2026

Related U.S. Application Data

(60) Provisional application No. 63/750,105, filed on Jan. 27, 2025.

(51) Int. Cl.

| | |
|---|---|
| ***G06T 11/60*** | (2026.01) |
| ***G06F 3/01*** | (2006.01) |
| ***G06T 3/40*** | (2006.01) |
| ***G06T 7/70*** | (2017.01) |

(52) U.S. Cl.

CPC .............. *G06T 11/60* (2013.01); *G06F 3/013* (2013.01); *G06T 3/40* (2013.01); *G06T 7/70* (2017.01); *G06T 2207/30201* (2013.01)

(58) Field of Classification Search

CPC ....................................................... G06T 11/60
USPC ........................................................ 345/156
See application file for complete search history.

(56) References Cited

U.S. PATENT DOCUMENTS

| | | | | |
|---|---|---|---|---|
| 9,275,680 | B2 | 3/2016 | Zitnick, III et al. | |
| 10,078,367 | B2 | 9/2018 | Michaeil et al. | |
| 10,540,818 | B2 | 1/2020 | Akeley | |
| 11,954,786 | B2 | 4/2024 | Frommhold et al. | |
| 2015/0192992 | A1 | 7/2015 | Di Censo et al. | |
| 2019/0078880 | A1 | 3/2019 | Nagori et al. | |
| 2020/0089316 | A1 | 3/2020 | Raskar | |
| 2022/0404578 | A1 * | 12/2022 | Lee | H04N 23/671 |

(Continued)

FOREIGN PATENT DOCUMENTS

| | | |
|---|---|---|
| KR | 20160149252 A | 12/2016 |

OTHER PUBLICATIONS

International Search Report dated May 6, 2026 in connection with International Patent Application No. PCT/IB2026/050626, 8 pages.

*Primary Examiner* — Long D Pham

(57) ABSTRACT

A method includes obtaining, using a plurality of sensors of an electronic device, an image frame of a scene and data associated with the image frame, where the data includes user eye behavior data. The method also includes identifying, using at least one processing device of the electronic device, a focus region in the image frame based on the user eye behavior data. The method further includes reconstructing, using the at least one processing device, a plane in the focus region. The method also includes performing, using the at least one processing device, a planar reprojection using the reconstructed plane and a predicted head pose of a user to generate a modified image frame. In addition, the method includes rendering, using the at least one processing device, an image for display based on the modified image frame.

20 Claims, 8 Drawing Sheets

(56) References Cited

U.S. PATENT DOCUMENTS

| | | | |
|---|---|---|---|
| 2024/0223742 A1 | 7/2024 | Xiong et al. | |
| 2024/0257475 A1* | 8/2024 | Xiong | G06T 7/593 |
| 2024/0267524 A1 | 8/2024 | Trepte | |

* cited by examiner

FINAL VIEW FRAME GENERATION WITH DYNAMIC REGIONAL PLANE RECONSTRUCTION AND EXTRACTION

CROSS-REFERENCE TO RELATED APPLICATION AND PRIORITY CLAIM

This application claims priority under 35 U.S.C. § 119 (e) to U.S. Provisional Patent Application No. 63/750,105 filed on Jan. 27, 2025, which is hereby incorporated by reference in its entirety.

TECHNICAL FIELD

This disclosure relates generally to image processing systems and processes. More specifically, this disclosure relates to final view frame generation with dynamic regional plane reconstruction and extraction.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to final view frame generation with dynamic regional plane reconstruction and extraction.

In a first embodiment, a method includes obtaining, using a plurality of sensors of an electronic device, an image frame of a scene and data associated with the image frame, where the data includes user eye behavior data. The method also includes identifying, using at least one processing device of the electronic device, a focus region in the image frame based on the user eye behavior data. The method further includes reconstructing, using the at least one processing device, a plane in the focus region. The method also includes performing, using the at least one processing device, a planar reprojection using the reconstructed plane and a predicted head pose of a user to generate a modified image frame. In addition, the method includes rendering, using the at least one processing device, an image for display based on the modified image frame.

In a second embodiment, an apparatus includes a plurality of sensors configured to obtain an image frame of a scene and data associated with the image frame, where the data includes user eye behavior data. The apparatus also includes at least one processing device configured to identify a focus region in the image frame based on the user eye behavior data, reconstruct a plane in the focus region, perform a planar reprojection using the reconstructed plane and a predicted head pose of a user to generate a modified image frame, and render an image for display based on the modified image frame.

In a third embodiment, a non-transitory machine readable medium contains instructions that when executed cause at least one processor of an electronic device to obtain an image frame of a scene and data associated with the image frame, where the data includes user eye behavior data. The non-transitory machine readable medium also contains instructions that when executed cause the at least one processor to identify a focus region in the image frame based on the user eye behavior data, reconstruct a plane in the focus region, perform a planar reprojection using the reconstructed plane and a predicted head pose of a user to generate a modified image frame, and render an image for display based on the modified image frame.

Any one or any combination of the following features may be used with the first, second, or third embodiment. The focus region may be identified by identifying a focus point of the user based on the user eye behavior data, identifying an interpupillary distance (IPD) of the user and an eye gaze vector for each eye of the user, identifying an eye vergence angle based on the eye gaze vectors, and determining a focus region size based on the eye vergence angle and a focal distance between the focus point and a midpoint of the IPD. The plane may be reconstructed by determining whether a depth map associated with the image frame is available and reconstructing the plane based on the depth map in response to a determination that the depth map for the focus region is available or based on object detection data in response to a determination that the depth map is not available. The plane may be reconstructed based on the depth map by reducing noise in depth data of the depth map to generate a noise-reduced depth map, performing depth densification of the noise-reduced depth map to generate a densified depth map, increasing resolution of the densified depth map to generate a resolution-enhanced depth map, generating at least one three-dimensional (3D) point cloud using the resolution-enhanced depth map, reconstructing the plane using the at least one 3D point cloud, defining the reconstructed plane as a reprojection plane, and measuring a surface normal and an origin of the reprojection plane. The reconstructed plane may be defined as the reprojection plane by defining a plane model having model parameters based on a portion of the at least one 3D point cloud; determining whether the plane model satisfies a threshold; in response to a determination that the plane model does not satisfy the threshold, updating the plane model with a different portion of the at least one 3D point cloud until the updated plane model satisfies the threshold; in response to a determination that the plane model or the updated plane model satisfies the threshold, determining whether the reconstructed plane is suitable for the planar reprojection; in response to a determination that the reconstructed plane is suitable for the planar reprojection, identifying the reconstructed plane in the focus region as the reprojection plane; and, in response to a determination that the reconstructed plane is not suitable for the planar reprojection, selecting a default plane as the reprojection plane. The plane may be reconstructed by detecting one or more objects in the focus region; determining whether a plane is associated with the one or more objects; in response to a determination that the plane is detected, identifying the plane as a reprojection plane in the focus region; in response to a determination that the plane is not detected, selecting a default plane as the reprojection plane based on a position of each of the one or more objects; and measuring a surface normal and an origin of the reprojection plane. The planar reprojection may be performed by identifying a surface normal and an origin of a reprojection plane, identifying a depth of the reprojection plane using the surface normal and the origin, identifying a homography transformation matrix, mapping image data in the image frame onto the reprojection plane using the homography transformation matrix to generate mapped image data; and adjusting the mapped image data based on the predicted head pose of the user to generate the modified image frame. A transformation may be applied to the modified image frame in order to generate a transformed image frame, and the transformed image frame may be rendered.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
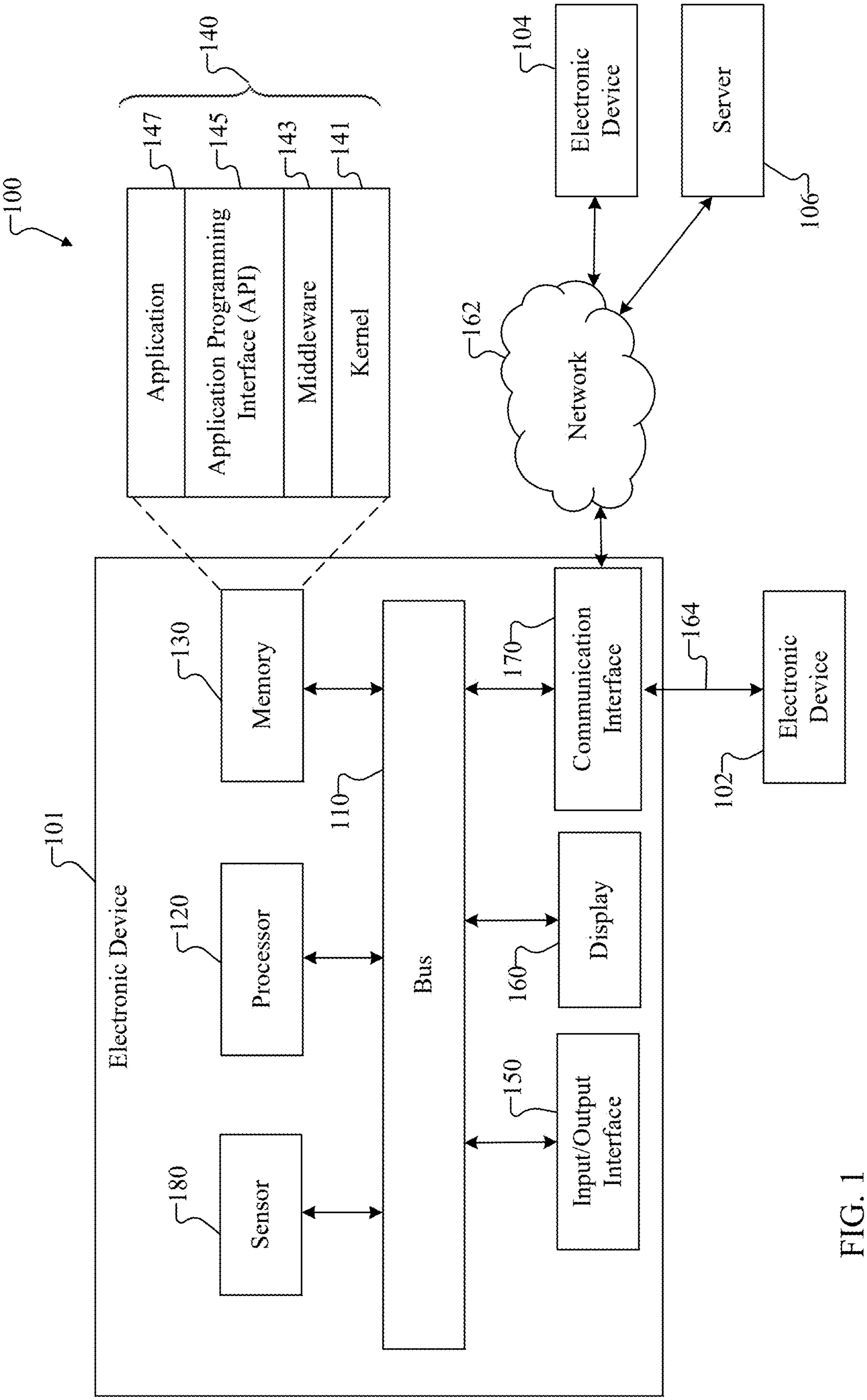
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

A VST XR device often includes one or more imaging sensors (also called "see-through cameras") that capture high-resolution image frames of a user's surrounding environment. These image frames are processed in an image processing pipeline in order to generate final rendered views of the user's surrounding environment. Unfortunately, VST XR devices can suffer from various problems. One problem is the latency of the VST XR pipeline, which affects a user's experience of the XR device. For example, an image frame will often be captured at one time, but a rendered image will typically be displayed to the user some amount of time later. It is possible for the user to move his or her head during this intervening time period. Unless compensation for the change in the user's head pose is made at or prior to rendering, the user may suffer motion sickness, thereby degrading the user experience.

To compensate for head pose changes during see-through frame transformation and final view frame generation, a final view frame can be reprojected from a captured head pose to a predicted head pose. Such reprojection is usually applied to avoid requiring a high-resolution dense depth map, which may be difficult to obtain. However, as the user's head pose changes, the user's focus may also change. Thus, detecting and reconstructing a plane in the user's focus region often plays an important or useful role in effective and accurate reprojection.

This disclosure provides various techniques for final view frame generation with dynamic regional plane reconstruction and extraction in XR or other applications. As described in more detail below, an image frame and associated data can be obtained using a plurality of sensors, and the data can include user eye behavior data. A focus region in the image frame can be identified based on the user eye behavior data, and a plane in the focus region can be reconstructed. A planar reprojection can be performed using the reconstructed plane and a predicted head pose of a user to generate a modified image frame, and an image can be rendered for display based on the modified image frame.

In this way, the disclosed techniques can be used to provide planar reprojection on a reprojection plane, such as a best-fit reconstructed plane, thereby improving the user's experience. For example, the disclosed techniques can be used to build different plane models for reconstruction in the user's focus region. Each plane model can be compared to a threshold, and the plane models satisfying the threshold may be utilized for planar reprojection. Also, the plane models satisfying the threshold may be compared to a previously-selected plane model. If a plane model's performance falls below that of the previously-selected plane model, the plane model can be disregarded, and a default plane may be used for planar reprojection. Thus, the reprojection plane effectively compensates for possible changes in user head poses, significantly improving the user's experience.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to final view frame generation with dynamic regional plane reconstruction and extraction in XR or other applications.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform final view frame generation with dynamic regional plane reconstruction and extraction in XR or other applications. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include cameras or other imaging sensors, which may be used to capture image frames of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to final view frame generation with dynamic regional plane reconstruction and extraction in XR or other applications.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
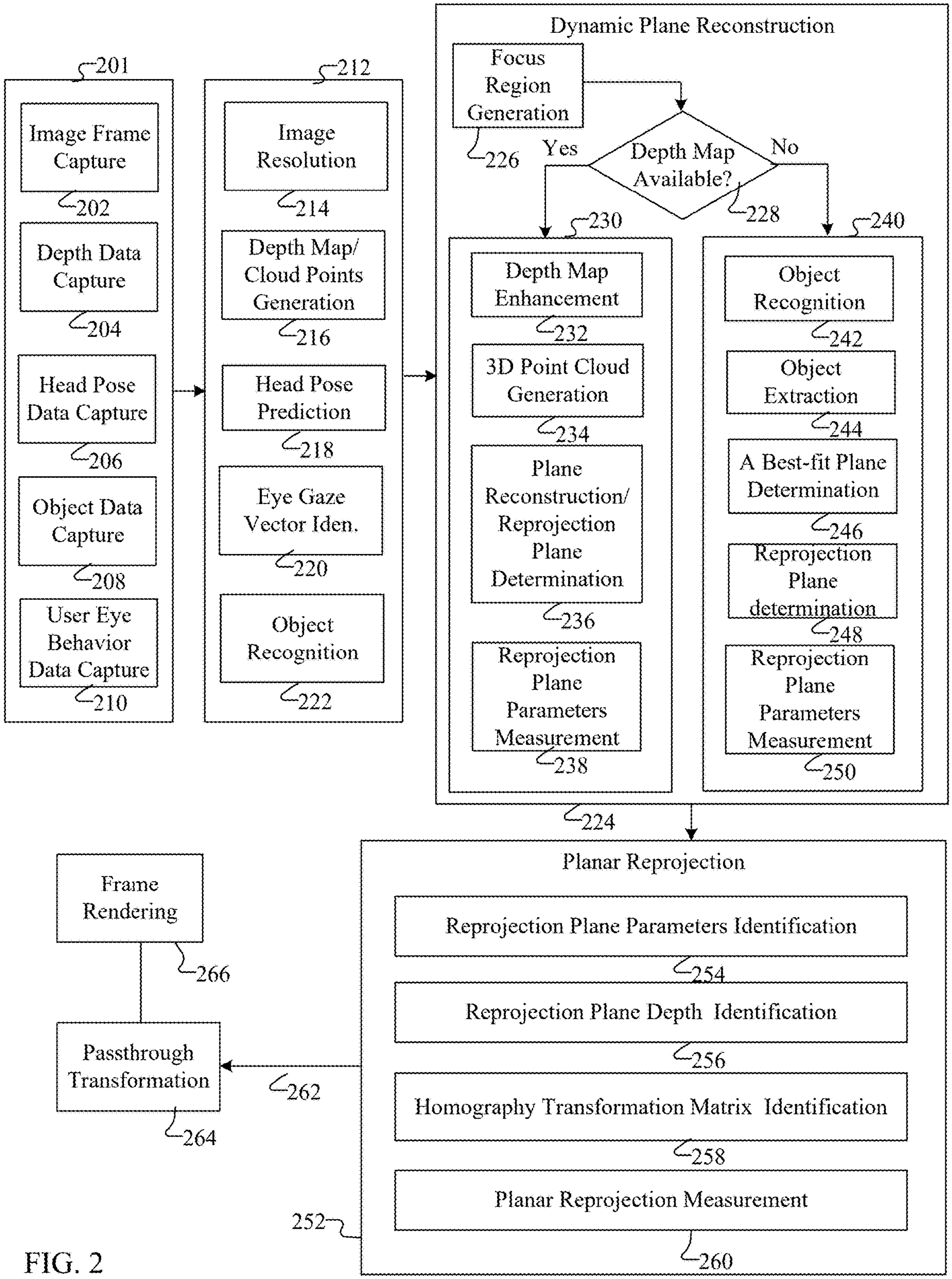
FIG. 2 illustrates an example process for dynamic regional plane detection and reconstruction for planar reprojection in extended reality (XR) or other applications in accordance with this disclosure.

FIG. 2 illustrates an example process 200 for dynamic regional plane detection and reconstruction for planar reprojection for XR or other applications in accordance with this disclosure. For ease of explanation, the process 200 shown in FIG. 2 is described as being performed using the electronic device 101 in the network configuration 100 shown in FIG. 1. However, the process 200 shown in FIG. 2 may be performed using any other suitable device(s) and in any other suitable system(s).

As shown in FIG. 2, the process 200 includes a data collection operation 201, a data pre-processing operation 212, a dynamic plane reconstruction operation 224, a planar reprojection operation 252, a passthrough transformation operation 262, and a frame rendering operation 266. The data collection operation 201 generally operates to obtain image frames and associated data and includes an image frame capture operation 202, a depth data capture operation 204, a head pose data capture operation 206, an object data capture operation 208, and a user eye behavior data capture operation 210. The image frame capture operation 202 generally operates to capture image frames of scenes. Each image frame may be captured by the electronic device 101, such as by using one or more imaging sensors 180 of the electronic device 101. In some cases, each captured image frame may represent an image frame of a scene captured by a forward-facing or other imaging sensor(s) 180 of the electronic device 101.

The depth data capture operation 204 generally operates to obtain depth data associated with each image frame. The depth data may be obtained from any suitable source(s), such as from one or more depth sensors like at least one time-of-flight (ToF) sensor, light detection and ranging sensor (LiDAR), or stereo vision sensor. In some cases, for example, the depth data may include time measurements of light pulses returning to a ToF sensor, distorted light patterns, or RGB images from slightly different angles.

The head pose data capture operation 206 generally operates to obtain information related to the pose of the user's head while the electronic device 101 is being used. The head pose information may be obtained from any suitable source(s), such as from one or more positional sensors like at least one IMU. In some cases, the head pose information may be expressed using six degrees of freedom, such as three translation values and three rotation values. The three translation values may identify movement of the user's head along three orthogonal axes, and the three rotation values may identify rotation of the user's head about the three orthogonal axes. Note, however, that the head pose information may have any other suitable form.

The object data capture operation 208 generally operates to detect and track one or more objects in a scene. The object data may be obtained from any suitable source(s), such as from one or more machine learning models or other logic configured to identify objects in images. The user eye behavior data capture operation 210 generally operates to track the movements, positions, and focus of the user's eyes. The user eye behavior data may be obtained from any suitable source(s), such as inward-facing cameras, infrared illuminators, lenses, and optics. In some cases, images of the user's eyes may be acquired continuously at a high frame rage (such as 60-120 Hz) to track rapid movements, and infrared light can be used to enhance contrast between the pupil, iris, and glints of the user's eyes. During rapid eye movements, the user's pupil positions, corneal reflections, and iris outlines can be tracked.

The data pre-processing operation 212 generally operates to pre-process the captured image frames and associated data. For example, an image resolution pre-processing operation 214 generally operates to pre-process the captured image frames. In some cases, the image frames may represent high-resolution color image frames captured at each of left and right see-through imaging sensors. Any suitable pre-processing of the captured image frames may be performed here, such as noise filtering, lens distortion correction, color correction, edge enhancement, and artifact removal.

A depth map and cloud point reconstruction operation 216 generally operates to generate depth maps and 3D cloud points based on the image frames. A depth map represents a two-dimensional (2D) grid in which each pixel represents a distance or depth to a point in a scene. In some cases, to generate a depth map, a depth value for each pixel or point is measured. If a ToF sensor is used, each depth value may be obtained by converting time to distance, such as by using $$d = \frac{c \cdot t}{2}.$$

Here, c is the speed of light, and t is a round-trip time. If stereo vision is used, a disparity (pixel shift) between matching points in left and right images can be measured to obtain distance, such as by using $$d = \frac{b \cdot f}{\text{disparity}}.$$

Here, b is a baseline distance between left and right imaging sensors, and f is a focal length. Once a depth value is obtained, any appropriate pre-processing (such as noise reduction and hole filling) may be performed on the raw depth values. The raw depth values may be converted into a 2D grid aligned with an imaging sensor's resolution, and the depths may be scaled to a range to generate a depth map.

A 3D point cloud may be constructed by converting each pixel's depth value into 3D coordinates (x, y, z) in an imaging sensor's coordinate system. For example, for a pixel at (u, v) with depth Z, the following may be used to generate 3D coordinates.

$$X = Z \cdot \frac{u - c_x}{f_x}$$

$$Y = Z \cdot \frac{v - c_y}{f_y}$$

$$Z = Z(\text{from the depth map})$$

A set of 3D points can therefore be constructed from a depth map for each image frame, forming a 3D point cloud for each image frame.

A head pose prediction operation 218 generally operates to predict a change in the user's head pose between a time of image frame capture and a time of final image frame rendering. As noted above, the user's head may move during use of an XR device or other device, causing misalignment between captured image frames and rendered frames. The head pose prediction operation 218 can predict the head pose of the user at the time of image rendering, thereby allowing for the adjustment of displayed content. In some cases, a current head pose $P_0$ can be captured by an IMU or other sensor(s) at the time of image capture and can be tracked continuously. The user's head pose can be extrapolated forward in time, such as by using velocity over a latency period, to obtain a predicted head pose $P_1$ at rendering. For example, let the initial head pose $P_0$ be expressed in six degrees of freedoms as $P_0=(x_0, y_0, z_0, \theta_0, \phi_0, \varphi_0)$. An IMU or other sensor(s) can detect a change in head (such as a 100°/s yaw velocity) and predict degrees of head pose shift at a time of rendering. Here, the predicted head pose can be expressed as $P_1=P_0+2°$ for a two-degree shift in the user's head pose.

Figure 4:
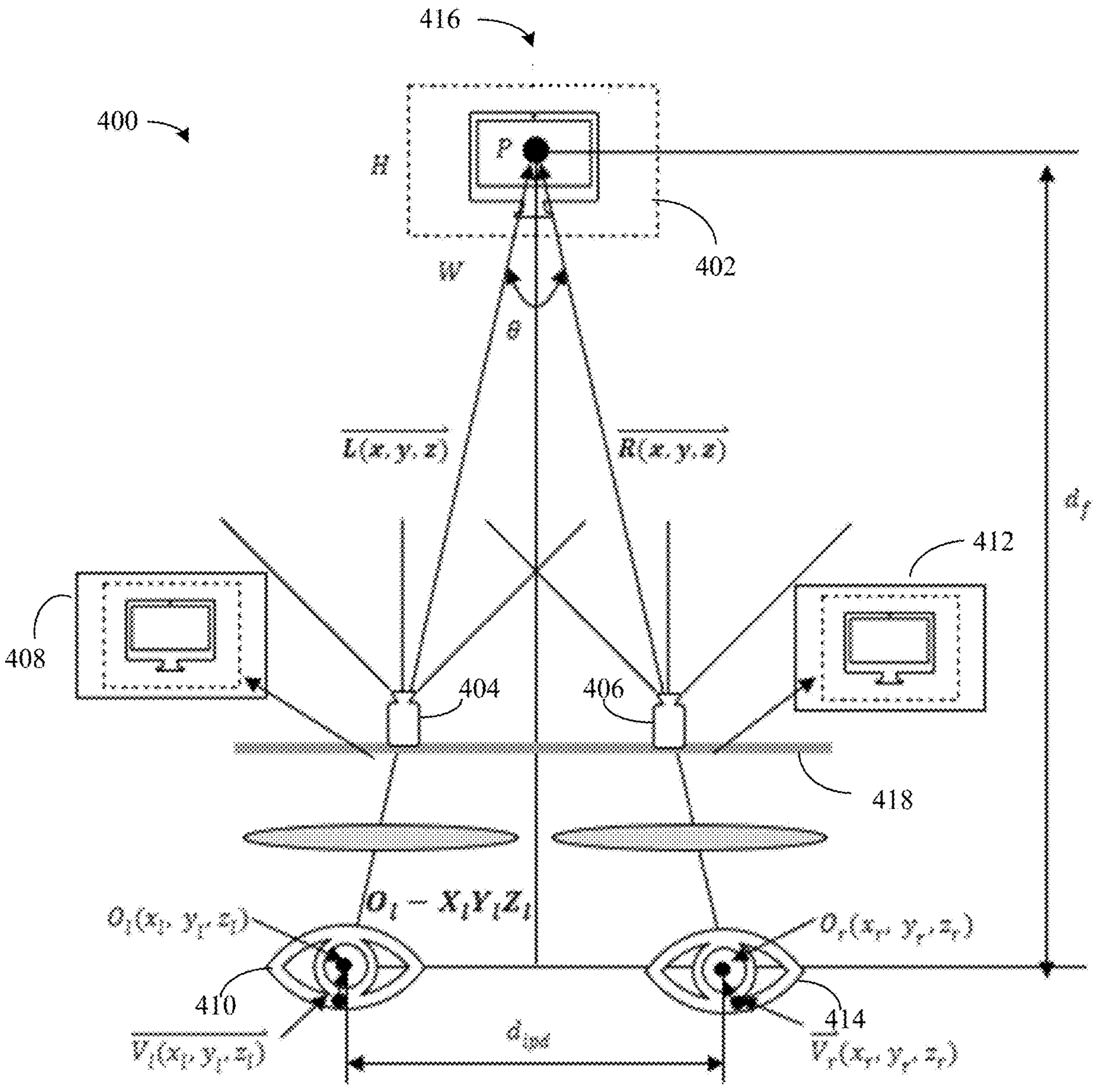
FIG. 4 illustrates an example technique for focus region generation for dynamic regional plane detection and reconstruction for planar reprojection in XR or other applications in accordance with this disclosure.
Figure 5:
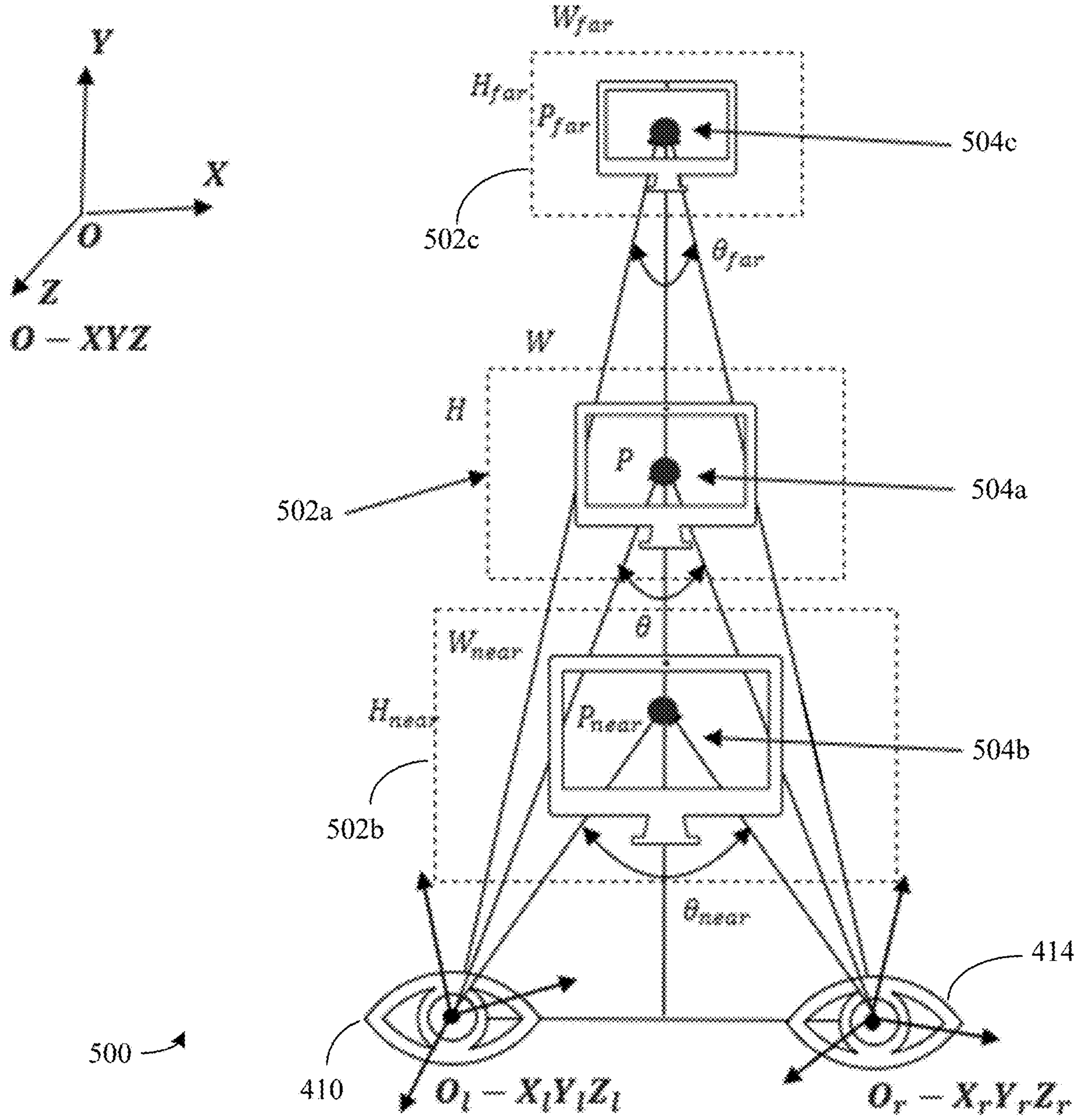
FIG. 5 illustrates an example technique for adaptively changing a size of a focus region for dynamic plane detection and reconstruction for planar reprojection in XR or other applications in accordance with this disclosure.

An eye gaze vector identification operation 220 generally operates to identify an eye gaze vector of the user. For example, the user may focus on a 3D point in a scene while wearing the electronic device 101 (as illustrated in FIGS. 4 and 5). The user's eye movements can be obtained by tracking the user's eyes and estimating the eye gaze direction of the user's eyes. In some cases, an eye tracking system may include illuminators, high-resolution cameras, and a processor (such as a processor 120). The illuminators can emit infrared or other light toward the user's eyes, and the high-resolution cameras can capture images of pupil reflections and corneal reflections. The processor can analyze the pupil and corneal reflections to identify direction vectors of the user's eye focus and eye gaze, which can be expressed as follows.

$$\begin{cases} \overrightarrow{V_l(x_l, y_l, z_l)}, \\ \overrightarrow{V_r(x_r, y_r, z_r)} \end{cases}$$

Here, $\overrightarrow{V_l(x_l, y_l, z_l)}$ is the eye gaze vector of the user's left eye, and $\overrightarrow{V_r(x_r, y_r, z_r)}$ is the eye gaze vector of the user's right eye. In some cases, the eye gaze vectors can be expressed in a global coordinate system, such as in the following manner.

$$\begin{cases} \overrightarrow{L(x, y, z)} \leftarrow \overrightarrow{V_l(x_l, y_l, z_l)} \\ \overrightarrow{R(x, y, z)} \leftarrow \overrightarrow{V_r(x_r, y_r, z_r)} \end{cases}$$

Here, $\overrightarrow{L(x, y, z)}$ is the eye gaze vector of the user's left eye, and $\overrightarrow{R(x, y, z)}$ is the eye gaze vector of the user's right eye. The pupil positions may be expressed as follows.

$$\begin{cases} O_l(x_l, y_l, z_l) \\ O_r(x_r, y_r, z_r) \end{cases}$$

Here, $O_l(x_l, y_l, z_l)$ is the position of the user's left pupil, and $O_r(x_r, y_r, z_r)$ is the position of the user's right pupil. The user's interpupillary distance (IPD) $d_{ipd}$ can be defined as follows.

$$d_{ipd} = \sqrt{(x_l - x_r)^2 + (y_l - y_r)^2 + (z_l - z_r)^2}$$

The user's eye vergence angle (EVA) θ with the eye gaze vectors can be defined as follows.

$$\cos\theta = \frac{\overrightarrow{L(x, y, z)} \cdot \overrightarrow{R(x, y, z)}}{|L(x, y, z)||R(x, y, z)|}$$

The eye vergence angle θ is in the range $[\theta_{far}, \theta_{near}]$. Here, $\theta_{near}$ is the eye vergence angle of the far target, where $\theta_{far} \leq \theta_{near}$. The identified eye gaze vectors and vergence angles can be used to define a focus region of the user.

An object recognition operation 222 generally operates to identify one or more objects in scenes captured in image frames and to recognize the one or more objects. For example, the captured image frames may be pre-processed to remove noise, adjusted for lighting, and aligned with depth data, and each object can be detected and tracked across multiple image frames. Any suitable technique(s) may be used by the object recognition operation 222. For object recognition, detection and recognition techniques such as Scale-Invariant Feature Transform (SIFT) or Speeded-up Robust Features (SURF) can be used to match known object templates or recognize edges and shapes, or deep learning models like You Only Look Once (YOLO), Single-Shot Multibox Detector (SSD), or convolutional neural network (CNNs) trained on datasets can be used to classify and locate objects in real-time. For object tracking, optical flow or Kalman filtering may be used.

The dynamic plane reconstruction operation 224 generally operates to detect planes and reconstruct the detected planes in focus regions of image frames. In this example, the dynamic plane reconstruction operation 224 includes a focus region generation operation 226, a depth map-based plane reconstruction operation 230, and an object recognition-based plane reconstruction operation 240. The focus region generation operation 226 generally operates to identify a focus region of a user. Example approaches for the focus region generation operation 226 are described in detail below with reference to FIGS. 4 and 5. In some cases, only a focus and gaze region (such as a focus region) created from the user's eye focus and eye gaze point (such as a focus point) may be used so that only the plane(s) in the focus region may be considered for dynamic regional plane detection and reconstruction.

A determination operation 228 generally operates to determine whether a depth map is available for each image frame. If a depth map is available, a depth map-based plane reconstruction operation 230 generally operates to detect and reconstruct a plane in the focus region and define a reprojection plane for rendering of a final image for that image frame. A depth map enhancement operation 232 generally operates to pre-process the depth data with noise reduction in the user's focus region to obtain a high-resolution dense map in the focus region. For example, a super-resolution technique using a CNN can be applied to increase the resolution. Also, since depth maps often lose sharp edges, techniques like bilateral filtering or guided filtering can be used to enhance the edges. Additionally, temporal smoothing may be performed, such as to reduce flickering or jitters in the depth map.

A 3D point cloud generation operation 234 generally operates to generate 3D point clouds using high-resolution dense depth maps and captured image frames. Since each depth map is 2D, the depth maps can be converted into 3D point clouds. For example, each pixel in a depth map can have (u, v) coordinates and a depth value d. Using a depth sensor's intrinsic parameters, each pixel can be projected into 3D space. For instance, an intrinsic parameter matrix for a depth sensor camera may be defined as follows.

$$K = \begin{bmatrix} f_x & 0 & c_x \\ 0 & f_y & c_y \\ 0 & 0 & 1 \end{bmatrix}$$

Here, $f_x$ and $f_y$ are focal lengths in the x and y directions, and $c_x$ and $c_y$ are coordinates of the center point of an image. The 3D coordinates (x, y, z) for the pixel can therefore be calculated as follows.

$$x = \frac{(u - c_x) \cdot d}{f_x},\ y = \frac{(v - c_y)d}{f_y},\ z = d$$

A 3D point cloud (a set of 3D points) can be generated using the 3D coordinates for the pixels in a corresponding depth map.

A plane reconstruction and reprojection plane determination operation 236 generally operates to reconstruct a best-fit plane in the focus region with the 3D point cloud for each image frame. For example, the electronic device 101 can reconstruct a 3D plane with the 3D point cloud created from each captured image frame and corresponding depths of the focus region, as well as from the direction and location of the origin of the reconstructed plane. A best-fit plane may represent the plane that minimizes the total distance (or error) between the 3D points and the 3D plane. In some cases, the error can be measured using techniques like a least squares approach or random sample consensus (RANSAC). A reprojection plane parameters measurement operation 250 generally operates to measure a surface normal and an origin of each reprojection plane. The surface normal ($\vec{n}$) for a plane can be defined as ax+by+c=z and may be expressed as a vector (a, b, c). The origin of the reprojection plane may be point O as illustrated in FIGS. 3B and 3C described below.

If a depth map is not available, the object recognition-based plane reconstruction 240 generally operates to perform object recognition-based plane detection and reconstruction in the focus region for each image frame. For example, an object recognition operation 242 generally operates to detect, track, and recognize one or more planar objects in the focus region. The object recognition operation 242 can recognize planar objects using any suitable technique(s). In some cases, the one or more planar objects may include tables or other objects having relatively flat surfaces on which the user may focus. An object extraction operation 244 generally operates to extract the one or more planar objects recognized in the focus region. Features from the image frame can be extracted to identify an object in the focus region, such as by using SIFT or SURF. In some cases, the extracted features for each object can be matched to a template or a known object to classify the detected object.

A best-fit plane determination operation 246 generally operates to select a best-fit plane for a current view of each image frame. For example, the best-fit plane determination operation 246 can extract planes associated with detected planar objects in the user's focus region, such as by identifying 2D regions that correspond to planar surfaces associated with the detected objects. The best-fit plane determination operation 246 can also infer 3D planes, such as by projecting the 2D regions into a 3D space based on assumptions associated with the detected objects (such as a height of each object). The best-fit plane can be identified among the 3D planes.

A reprojection plane determination operation 248 generally operates to define a reconstructed plane as a reprojection plane and measure depths of the reprojection plane boundaries for each image frame. For example, the reprojection plane determination operation 248 can identify a reconstructed best-fit plane as the reprojection plane for rendering of each final image. The boundaries can represent the 3D corners of one or more planar objects, and the depths of the boundaries can be the distances of the boundaries from one or more imaging sensors. The reprojection plane parameters measurement operation 250 generally operates to measure the surface normal and the origin of each reprojection plane using the parameters of the best-fit plane. That is, the surface normal of the best-fit plane can be the surface normal of the reprojection plane, and the origin of the best-fit plane can be the origin of the reprojection plane.

The planar reprojection operation 252 generally operates to perform planar reprojection based on the reconstructed plane in the focus region for each image frame. For example, a reprojection plane parameters identification operation 254 generally operates to obtain the surface normal and the location of the origin for each reprojection plane. A reprojection plane depth identification operation 256 generally operates to identify the depth of the reprojection plane with the surface normal and the location of the origin. In some cases, the depth of the reprojection plane can be measured as the perpendicular distance from an imaging sensor to the plane. A homography transformation matrix identification operation 258 generally operates to identify a homography transformation matrix. A homography is a 2D projective transformation that maps points from one plane to another. In some cases, each homography can be represented by a 3×3 matrix, such as one with eight degrees of freedom. Also, in some cases, each homography can be identified using pairs of corresponding points from a source plane (the detected and reconstructed plane) and the reprojection plane.

A planar reprojection measurement operation 260 generally operates to perform planar reprojection with the homography transformation matrix and the predicted head pose for each image frame. In computing the homography transformation matrix for reprojection, a projection depth may be computed with information from the reprojection plane and the predicted head pose. Suppose $I_1$ is the image frame at head pose $S_1$ and $I_2$ is the image frame at head pose $S_2$. The image frame $I_1$ may be transformed to the image frame $I_2$ with a homography transformation, such as in the following manner.

$$I_2(x, y) = HI_1(x, y) \tag{1}$$

Here, H is the homography transformation matrix, which may be expressed as follows.

$$H = R - tV^T$$

$$V = \frac{n}{d}$$

Here, R is a rotation matrix, t is a translation vector, n is the normal vector, and d is the depth of the reprojection plane. The planar reprojection transformation can be performed to generate the final view frame $I_2$ from the captured see-through frame $I_1$ with the predicted head pose.

The passthrough transformation operation 262 generally operates to apply one or more transformations to each reprojected image frame produced by the planar reprojection operation 252 in order to generate a transformed image frame. For example, the passthrough transformation operation 262 may be used to compensate for things like registration and parallax errors, which may be caused by factors like differences between the positions of the imaging sensor(s) 180 and the user's eyes. As particular examples, the passthrough transformation operation 262 may apply a rotation and/or a translation to each reprojected image frame in order to compensate for these or other types of issues. Ideally, the transformations give the appearance that the images presented to the user are captured at the locations of the user's eyes, when the image frames in reality are captured at one or more different locations. Often times, the rotation and/or translation can be derived mathematically based on the position and angle of each imaging sensor 180 and the expected or actual positions of the user's eyes. In some cases, the transformations are static (since these positions and angles will not change), allowing passthrough transformations to be applied quickly.

A frame rendering operation 264 generally operates create final views of the scene captured in the transformed image frames generated by the passthrough transformation operation 262. The frame rendering operation 264 can also render the final views for presentation to the user of the electronic device 101. For example, the frame rendering operation 264 may process the transformed image frames and perform any additional refinements or modifications needed or desired, and the resulting images can represent the final views of the scene. For instance, a 3D-to-2D warping can be used to warp the final views of the scene into 2D images. The frame rendering operation 264 can also present the rendered images to the user. For example, the frame rendering operation 264 can render the images into a form suitable for transmission to at least one display 160 and can initiate display of the rendered images, such as by providing the rendered images to one or more displays 160. In some cases, there may be a single display 160 on which the rendered images are presented for viewing by the user, such as where each eye of the user views a different portion of the display 160. In other cases, there may be separate displays 160 on which the rendered images are presented for viewing by the user, such as one display 160 for each of the user's eyes.

Although FIG. 2 illustrates one example of a process 200 for dynamic regional plane detection and reconstruction for planar reprojection for XR or other applications, various changes may be made to FIG. 2. For example, various components or functions in FIG. 2 may be combined, further subdivided, replicated, omitted, or rearranged and additional components or functions may be added according to particular needs. Also, the process 200 may be performed any suitable number of image frames and optionally any suitable number of sequences of image frames, such as a sequence of image frames from each of left and right see-through cameras or other stereo imaging sensors 180.

Figure 3A:
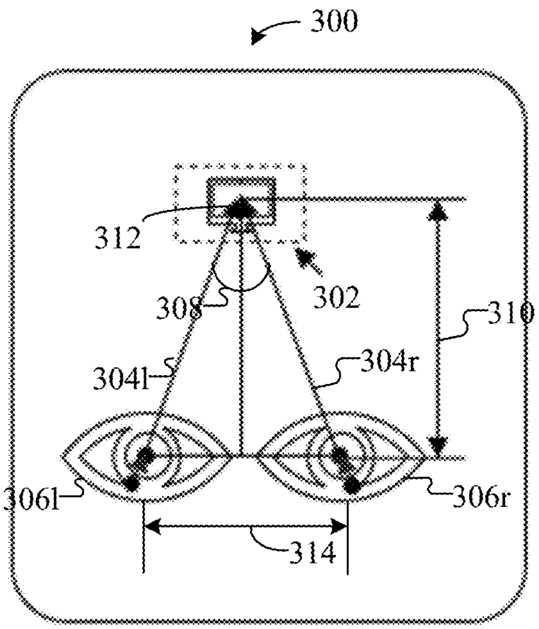
FIGS. 3A through 3C illustrate example functions in the process of FIG. 2 in accordance with this disclosure.
Figure 3B:
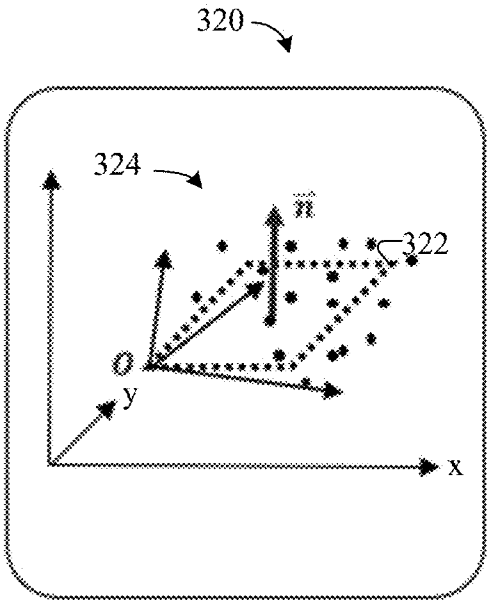
Figure 3C:
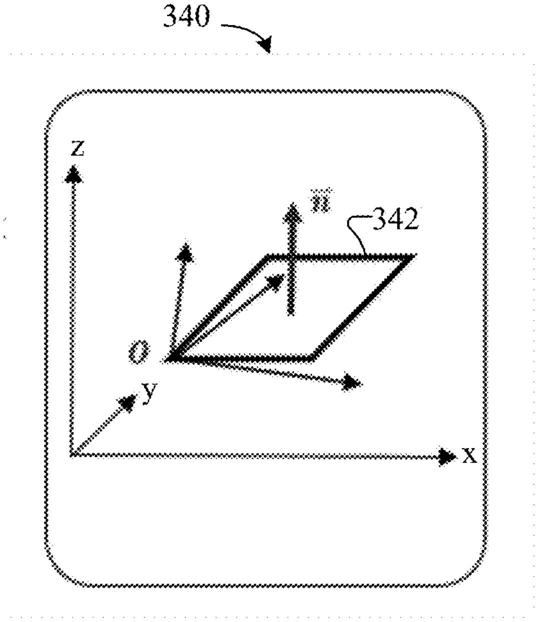

FIGS. 3A through 3C illustrate example functions in the process 200 of FIG. 2 in accordance with this disclosure. As shown in FIG. 3A, one operation associated with the process 200 is an adaptive focus region generation operation 300 using eye tracking and eye gaze estimation. Here, a focus region 302 can be generated by identifying the user's eye gaze vectors 304*l* and 304*r* for respective eyes 306*l* and 306*r* based on the eye tracking and eye gaze estimation. An interpupillary distance (IPD) 314 between the centers of the user's pupils can be measured, and an eye vergence angle 308 can be identified using the eye gaze vectors 304. The size of the focus region 302 can be adaptively determined using the eye vergence angle 308 and the focal distance 310 between a focus point 312 and the IPD 314.

As shown in FIG. 3B, another operation that may be associated with the process 200 is a regional depth-based plane detection operation 320, which may occur as part of the dynamic plane reconstruction operation 224. During the operation 320, the electronic device 101 can dynamically reconstruct a 3D plane 322 with a 3D point cloud 324 created from a captured image frame and corresponding depths of the focus region, as well as the direction and location of the origin O of the reconstructed plane 322. Upon detection and reconstruction of the plane, parameters such as the surface normal $\vec{n}$ of and the origin O of the reconstructed plane can be obtained. For example, for a plane defined as ax+by+c=z, the surface normal $\vec{n}$ may be the vector (a, b, c).

As shown in FIG. 3C, yet another operation that may be associated with the process 200 is an object recognition-based plane reconstruction object 340, which may occur as part of the dynamic plane reconstruction operation 224. One or more planar objects can be detected in the focus region and one or more planes can be detected and extracted based on the detected objects. One or more planes can be reconstructed and a best-fit plane 342 can be selected. A reprojection plane may be defined using the direction (the surface normal $\vec{n}$) and the origin O of the best-fit plane 342.

Although FIGS. 3A through 3C illustrate examples of functions in the process 200 shown in FIG. 2, various changes may be made to FIGS. 3A through 3C. For example, any suitable number of planes may be detected and reconstructed depending on the number of planar objects detected in the focus region.

FIG. 4 illustrates an example technique 400 for focus region generation for dynamic regional plane detection and reconstruction for planar reprojection in XR or other applications in accordance with this disclosure. The technique 400 may, for example, be used as part of the dynamic plane reconstruction operation 224 of FIG. 2. For ease of explanation, the technique 400 shown in FIG. 4 is described as being implemented using the electronic device 101 in the network configuration 100 shown in FIG. 1, where the electronic device 101 may implement the process 200 shown in FIG. 2. However, the technique 400 may be implemented using any other suitable device(s) and in any other suitable system(s), and the technique 400 may be used to implement any other suitable process(es) designed in accordance with this disclosure.

As illustrated in FIG. 4, the user may focus on a 3D point P in a 3D scene while using the electronic device 101, and the technique 400 can be used to identify a focus region 402. Two cameras 404, 406 (such as imaging sensors 180) capture a left image frame 408 viewed via the user's left eye 410 and a right image frame 412 viewed via the user's right eye 414. The image frames 408, 412 are rectified for alignment, and a focused image frame 416 is generated. For rendering a final image on a display 418, planar reprojection using a reconstructed plane in a focus region 420 is performed. In order for effective and accurate planar reprojection, the focus region 420 can be adaptively identified based on the user's eye behavior data. The user's eye behavior data can be obtained by tracking the eyes 410, 414 and estimating the user's eye gaze. The functionality of the eye gaze vector identification operation 220 may be used here to estimate the user's eye gaze.

Although FIG. 4 illustrates one example of a technique 400 for focus region generation for dynamic regional plane detection and reconstruction for planar reprojection in XR or other applications, various changes may be made to FIG. 4. For example, the focus region 420 may be identified in any other suitable manner, such as by using one or more trained machine learning models.

FIG. 5 illustrates an example technique 500 for adaptively changing a size of a focus region 502*a*-502*c* for dynamic plane detection and reconstruction for planar reprojection in XR or other applications in accordance with this disclosure. The technique 500 may, for example, be used as part of the dynamic plane reconstruction operation 224 of FIG. 2. For ease of explanation, the technique 500 shown in FIG. 5 is described as being implemented using the electronic device 101 in the network configuration 100 shown in FIG. 1, where the electronic device 101 may implement the process 200 shown in FIG. 2. However, the technique 500 may be implemented using any other suitable device(s) and in any other suitable system(s), and the technique 500 may be used to implement any other suitable process(es) designed in accordance with this disclosure.

As shown in FIG. 5, the size of a focus region may change as the user's eye vergence angle θ and focal distance $d_f$ between a focus point P and a midpoint of the user's IPD fluctuate. When the eyes 410, 414 focus on a far target $P_{far}$, the correspondence eye vergence angle is $\theta_{far}$. When the eyes 410, 414 focus on the near target $P_{near}$, the correspondence eye vergence angle is $\theta_{near}$. Thus, the eye vergence angle θ fluctuates between $\theta_{far}$ and $\theta_{near}$. Different sizes of the focus regions 502*a*-502*c* can be created for different eye vergence angles. Suppose $S_{far}(W_{far}, H_{far})$ is the size of the focus region 502*c* for the far target 504*c*, and $S_{near}(W_{near}, H_{near})$ is the size of the focus region 504*b* for the near target 504*b*. The size of the focus region S (W, H) for the target 504*a* between the near and far targets 504*b*, 504*c* can be described as follows.

$$S_{far}(W_{far}, H_{far}) \le S(W, H) \le S_{near}(W_{near}, H_{near})$$

The focus region 502*a* R (W, H) can be determined as follows.

$$R(W, H) = \mathcal{F}(\theta, X, Y, Z)$$

The size of the focus region changes as the eye vergence angle changes in the range $[\theta_{far}, \theta_{near}]$. Thus, the technique 500 allows dynamic determination and adaptation of the size of the focus region 502 using the instantaneous eye vergence angle.

Although FIG. 5 illustrates one example of a technique 500 for adaptively changing a size of a focus region 502*a*-502*c* for dynamic plane detection and reconstruction for planar reprojection in XR or other applications, various changes may be made to FIG. 5. For example, the size of a focus region may be identified in any other suitable manner, such as by using one or more trained machine learning models.

Figure 6:
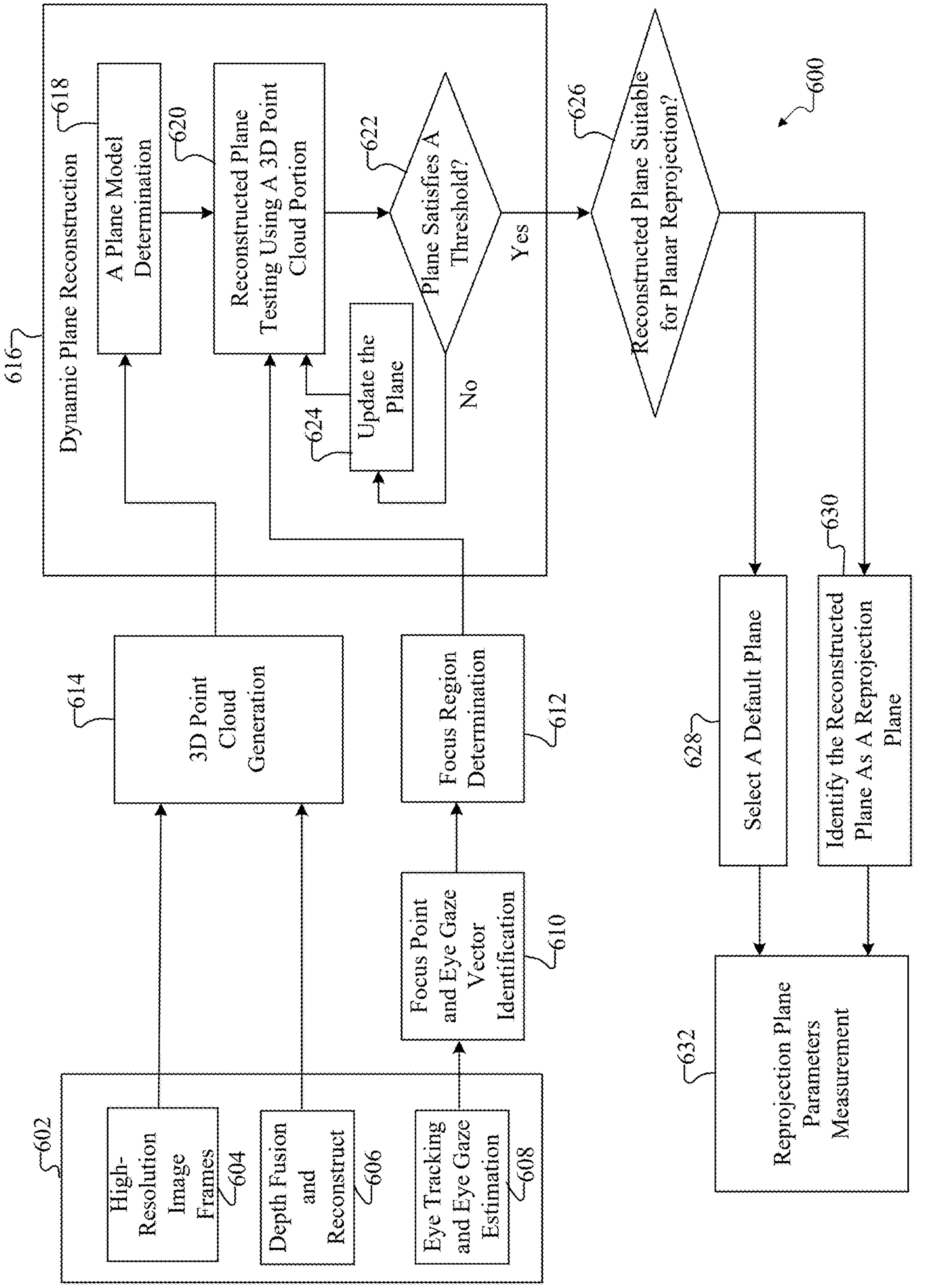
FIG. 6 illustrates an example technique for depth-based regional plane detection and reconstruction in XR or other applications in accordance with this disclosure.

FIG. 6 illustrates an example technique 600 for depth-based regional plane detection and reconstruction in XR or other applications in accordance with this disclosure. The technique 600 may, for example, be used as part of the depth map-based plane reconstruction operation 230 of FIG. 2. For ease of explanation, the technique 600 shown in FIG. 6 is described as being implemented using the electronic device 101 in the network configuration 100 shown in FIG. 1, where the electronic device 101 may implement the process 200 shown in FIG. 2. However, the technique 600 may be implemented using any other suitable device(s) and in any other suitable system(s), and the technique 600 may be used to implement any other suitable process(es) designed in accordance with this disclosure.

As shown in FIG. 6, a data collection operation 602 generally operates to obtain image frames and associated data, such as high-resolution see-through image frames 604, depth fusion and reconstruction data 606, and user eye behavior data 608 (including eye tracking and eye gaze estimation data). A 3D point cloud generation operation 614 generally operates reconstruct 3D point clouds based on this information. For example, the 3D point cloud generation operation 614 can receive the high-resolution image frames 604 and depth fusion and reconstruction data 606 and reconstruct 3D point clouds by projecting 2D pixels of the image frames into a 3D space based on the depths. Since the image frames are high-resolution, the depths may be processed with super resolution and densification so that the depth maps can have the same resolution as the image frames.

A focus point and eye gaze vector identification operation 610 generally operates to identify a focus point and eye gaze vectors of the user for each image frame. Thus, the user's eye focus and gaze point (such as the focus point) and the focal distance are obtained with the eye tracking and eye gaze estimation data. A focus region determination operation 612 generally operates to dynamically identify the focus region with a known location using the focus point, the eye gaze vectors and, the focal distance for each image frame. A dynamic plane reconstruction operation 616 generally operates to reconstruct a plane detected in the focus region for each image frame. A plane model determination operation 618 generally operates to define a plane model with model parameters for each image frame. For example, for a plane in the 3D space, a plane model can be defined as follows.

$$ax + by + c = z$$

Here, a, b, and c are coefficients of the defined plane. In some cases, the plane coefficients can be computed by the points on the plane, such as when the plane has a set of points defined as follows.

$$(x_i, y_i, z_i),\ i = 1, 2, \ldots, n$$

A testing operation 620 generally operates to fit and test the defined plane model with the least-fitting of curved surfaces by a subset (a portion) of the reconstructed 3D point cloud for each image frame. That is, the focus region can be dynamically identified with a known location using the focus point, the eye gaze vectors, and the focal distance for each image frame. In some cases, the plane model can be fit with the set of points using least squares solution, such as in the following manner.

$$\begin{pmatrix} x_0 & y_0 & 1 \\ x_1 & y_1 & 1 \\ & \cdots & \\ x_n & y_n & 1 \end{pmatrix} \begin{pmatrix} a \\ b \\ c \end{pmatrix} = \begin{pmatrix} z_0 \\ z_1 \\ \cdots \\ z_n \end{pmatrix}$$

The coefficients can be obtained by solving this equation, such as by using the following.

$$\begin{pmatrix} a \\ b \\ c \end{pmatrix} = (A^T A)^{-1} A^T B.$$

$$A = \begin{pmatrix} x_0 & y_0 & 1 \\ x_1 & y_1 & 1 \\ & \cdots & \\ x_n & y_n & 1 \end{pmatrix}$$

-continued $$B = \begin{pmatrix} z_0 \\ z_1 \\ \dots \\ z_n \end{pmatrix}$$

A threshold determination operation 622 generally operates to determine whether the current plane model satisfies a threshold. In some cases, the threshold can be a fitting threshold. For example, if the reconstructed plane model has a 10% better fit as compared to the previously reconstructed plane model, the reconstructed plane model can be determined to satisfy the fitting threshold. If the current reconstructed plane satisfies the threshold, it is determined to perform better than a previous plane model (if any). If it does not satisfy the threshold, an update operation 624 generally operates to update the current plane model with a new subset of the 3D point cloud, and the testing and updating operations 620, 624 can be repeated until the updated plane model satisfies the threshold.

A reprojection determination operation 626 generally operates to determine whether the reconstructed plane is suitable for planar reprojection. If it is determined that the reconstructed plane in the focus region is not suitable for planar reprojection, a selection operation 628 selects a default plane as the reprojection plane according to the position of a focused object. For example, if the reconstructed plane has a weighted score (such as a weighted score combining geometric accuracy, stability, coverage, and computational complexity) higher than a threshold score, the reconstructed plane can be determined as suitable for planar reprojection. If it is determined that the reconstructed plane is suitable for planar reprojection, then a plane identification operation 630 identifies the reconstructed plane in the focus region as a reprojection plane and computes parameters of the reprojection plane with the location of the origin and the surface normal of the reconstructed plane.

Although FIG. 6 illustrates one example of a technique 600 for depth-based regional plane detection and reconstruction in XR or other applications, various changes may be made to FIG. 6. For example, the depth-based regional plane detection and reconstruction may be performed in any other suitable manner, such as by using one or more trained machine learning models (like a DNN).

Figure 7:
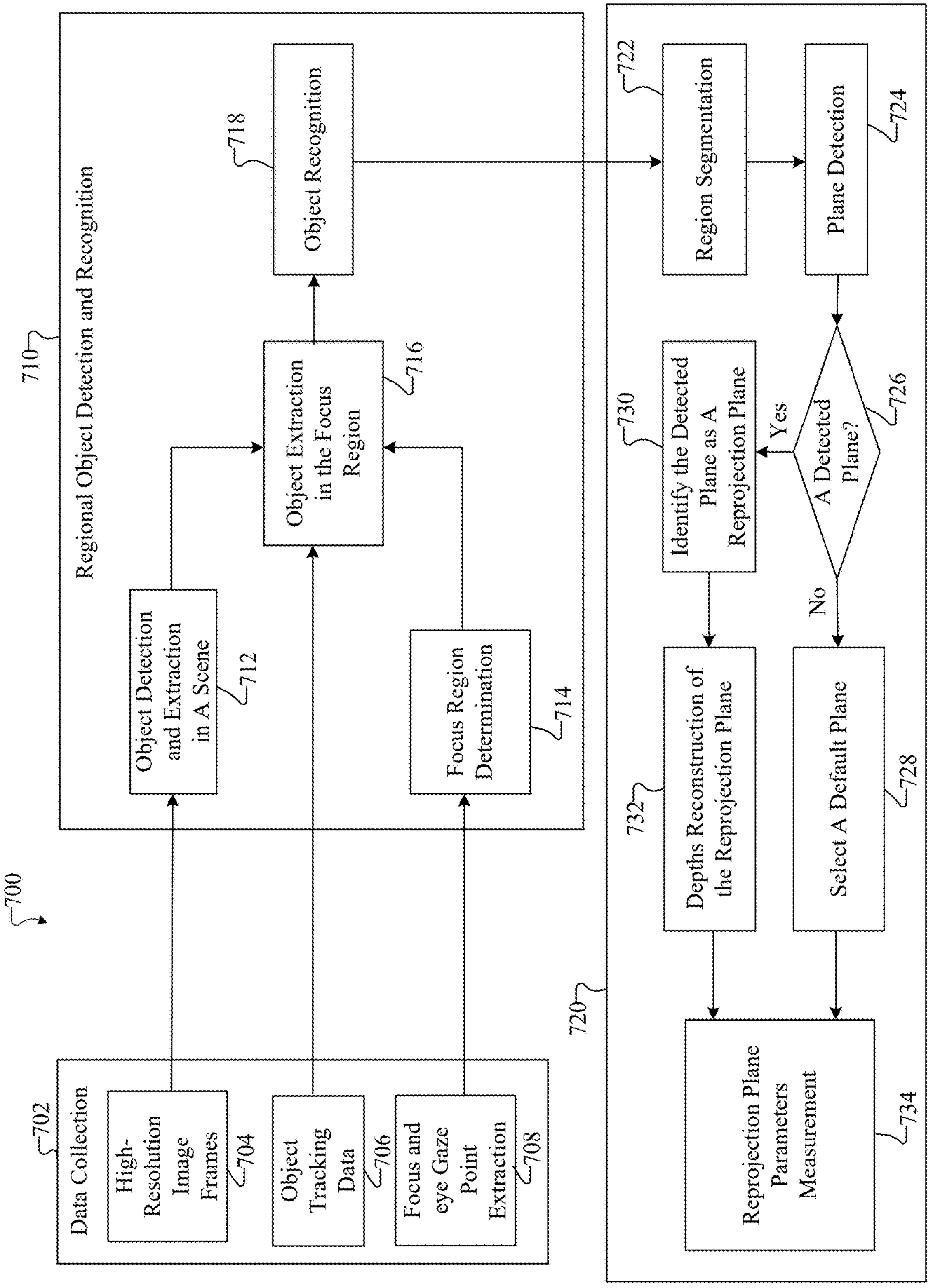
FIG. 7 illustrates an example technique for object recognition-based plane detection and reconstruction in XR or other applications in accordance with this disclosure.

FIG. 7 illustrates an example technique 700 for object recognition-based plane detection and reconstruction in XR or other applications in accordance with this disclosure. The technique 700 may, for example, be used as part of the object recognition-based plane reconstruction operation 240 of FIG. 2. For ease of explanation, the technique shown in FIG. 7 is described as being implemented using the electronic device 101 in the network configuration 100 shown in FIG. 1, where the electronic device 101 may implement the process 200 shown in FIG. 2. However, the technique 700 may be implemented using any other suitable device(s) and in any other suitable system(s), and the technique 700 may be used to implement any other suitable process(es) designed in accordance with this disclosure.

As shown in FIG. 7, the technique 700 includes a data collection operation 702, a regional object detection and recognition operation 710, and a regional plane detection and parameter measurement operation 720. The data collection operation 702 generally operates to obtain image frames and associated data, such as high-resolution see-through image frames 704, object tracking data 706, and focus and eye gaze point extraction data 708.

A regional object detection and recognition operation 710 generally operates to detect one or more planar objects in a focus region for each image frame. An object detection and extraction operation 712 generally operates to detect one or more planar objects in each image frame. A focus region determination operation 714 generally operates to identify a focus region using an identified focus and gaze point (a focus point) for each image frame. An object extraction operation 716 generally operates to extract the one or more planar objects detected in the focus region for each image frame. An object recognition operation 718 generally operates to recognize the one or more planar objects of focus in the focus region for each image frame.

A regional plane detection and parameter measurement operation 720 generally operates to measures parameters of a reprojection plane. A region segmentation operation 722 generally operates to perform regional semantic segmentation on the focused and recognized object to obtain segmented object regions for each image frame. A plane detection operation 724 generally operates to detect and extract planes with the segmented regions on the focused object within the focus region for each image frame.

A determination operation 726 generally operates to determine if a plane has been detected and extracted. If a detected and extracted plane does not exist, a selection operation 728 generally operates to define a default plane as the reprojection plane, such as according to the position of the focused object. If a detected and extracted plane exists, an identification operation 730 generally operates to identify the detected plane as a reprojection plane in the focus region. A measurement operation 734 generally operates to reconstruct depths of the points on the boundary of the defined reprojection plane in the focus region with the stereo image pairs. The measurement operation 734 can also measure the position and orientation of the reprojection plane, such as by using the depth of the points. The measurement operation 734 can further measure parameters including the origin and the surface normal of the reprojection plane with the position and orientation of the plane for planar reprojection.

Although FIG. 7 illustrates one example of a technique 700 for object recognition-based plane detection and reconstruction in XR or other applications, various changes may be made to FIG. 7. For example, the object recognition-based plane detection and reconstruction may be performed in any other suitable manner, such as by using one or more trained machine learning models (like a DNN).

In some embodiments, regional plane reconstruction and extraction may be performed with one or more machine learning models, such as a deep neural network (DNN). A DNN or other machine learning model can be developed and trained with collected data to allow the machine learning model to learn how to identify plane objects. The trained machine learning can be applied to reconstruct and extract planes in focus regions as reprojection planes. Also, in sone embodiments, regional planar reprojection with plane reconstruction and extraction may be performed after passthrough transformation. As such, viewpoint matching, parallax correction, and geometric transformation may be performed, and regional planar reprojection with regional plane reconstruction and extraction may be performed subsequently.

Figure 8:
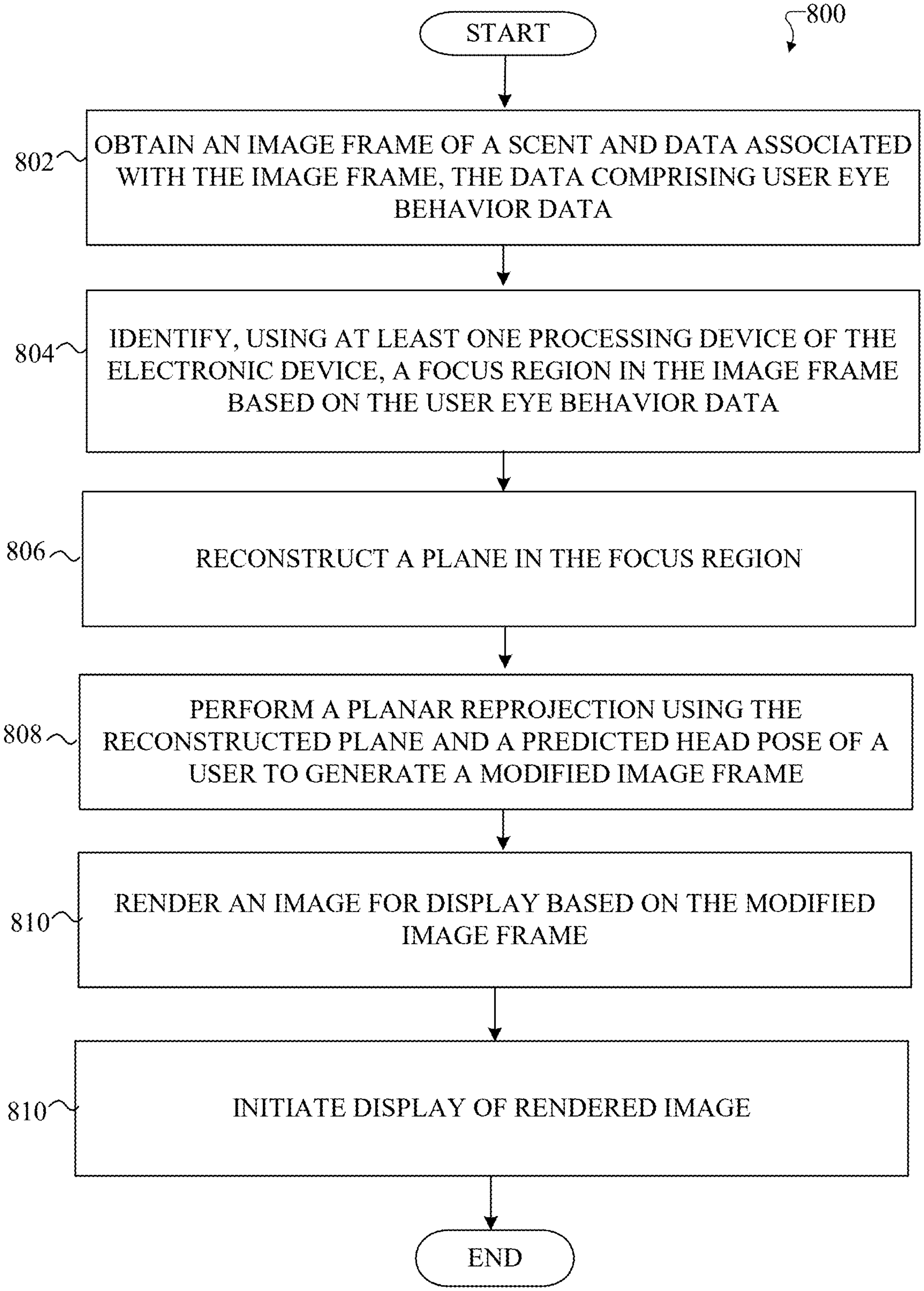
FIG. 8 illustrates an example method for dynamic regional plane detection and reconstruction for planar reprojection for XR or other applications in accordance with this disclosure.

FIG. 8 illustrates an example method 800 for dynamic regional plane detection and reconstruction for planar reprojection in XR or other applications in accordance with this disclosure. For ease of explanation, the method 800 shown in FIG. 8 is described as being performed using the electronic device 101 in the network configuration 100 shown in FIG. 1, where the electronic device 101 may implement the process 200 shown in FIG. 2. However, the method 800 may be performed using any other suitable device(s) and in any other suitable system(s), and the method 800 may be implemented using any other suitable process(es) or architecture(s) designed in accordance with this disclosure.

As shown in FIG. 8, at step 802, an image frame of a scene and data associated with the image frame are obtained. This may include, for example, the processor 120 of the electronic device 101 obtaining an image frame and data associated with the image frame using a plurality of sensors 180 of the electronic device 101. The data associated with the image frame can include user eye behavior data. At step 804, a focus region in the image frame is identified based on the user eye behavior data. This may include, for example, the processor 120 of the electronic device 101 identifying a focus point of the user based on the user eye behavior data, identifying an IPD of the user and an eye gaze vector for each eye of the user, identifying an eye vergence angle based on the eye gaze vectors, and determining a focus region size based on the eye vergence angle and a focal distance between the focus point and a midpoint of the IPD.

At step 806, a plane in the focus region is reconstructed. This may include, for example, the processor 120 of the electronic device 101 determining whether a depth map associated with the image frame is available and either (i) reconstructing the plane based on the depth map in response to a determination that the depth map for the focus region is available or (ii) reconstructing the plane based on object detection data in response to a determination that the depth map is not available. In some embodiments, the plane may be reconstructed based on the depth map by reducing noise in depth data of the depth map to generate a noise-reduced depth map; performing depth densification of the noise-reduced depth map to generate a densified depth map; increasing resolution of the densified depth map to generate a resolution-enhanced depth map; generating at least one 3D point cloud using the resolution-enhanced depth map; reconstructing the plane using the at least one 3D point cloud; defining the reconstructed plane as a reprojection plane; and measuring a surface normal and an origin of the reprojection plane.

In some cases, the reconstructed plane used as the reprojection plane may be defined by defining a plane model having model parameters based on a portion of the at least one 3D point cloud; determining whether the plane model satisfies a threshold; in response to a determination that the plane model does not satisfy the threshold, updating the plane model with a different portion of the at least one 3D point cloud until the updated plane model satisfies the threshold; in response to a determination that the plane model or the updated plane model satisfies the threshold, determining whether the reconstructed plane is suitable for the planar reprojection; in response to a determination that the reconstructed plane is suitable for the planar reprojection, identifying the reconstructed plane in the focus region as the reprojection plane; and, in response to a determination that the reconstructed plane is not suitable for the planar reprojection, selecting a default plane as the reprojection plane. In other cases, the plane may be reconstructed by detecting one or more objects in the focus region; determining whether a plane is associated with the one or more objects; in response to a determination that the plane is detected, identifying the plane as a reprojection plane in the focus region; in response to a determination that the plane is not detected, selecting a default plane as the reprojection plane based on a position of each of the one or more objects; and measuring a surface normal and an origin of the reprojection plane.

At step 808, a planar reprojection is performed to generate a modified image frame. This may include, for example, the processor 120 of the electronic device 101 performing the planar reprojection using the reconstructed plane and a predicted head pose of a user to generate the modified image frame. In some cases, this may include identifying a surface normal and an origin of a reprojection plane; identifying a depth of the reprojection plane using the surface normal and the origin; identifying a homography transformation matrix; mapping image data in the image frame onto the reprojection plane using the homography transformation matrix to generate mapped image data; and adjusting the mapped image data based on the predicted head pose of the user to generate the modified image frame.

At step 810, the modified image frame is rendered for display. This may include, for example, the processor 120 of the electronic device 101 applying a passthrough transformation and/or other transformation(s) to the modified image frame and rendering the resulting transformed image frame. At step 812, display of the rendered image is initiated. This may include, for example, the processor 120 of the electronic device 101 displaying the rendered image on at least one display 160 of the electronic device 101.

Although FIG. 8 illustrates one example of a method 800 for dynamic regional plane detection and reconstruction for planar reprojection in extended reality (XR) or other applications, various changes may be made to FIG. 8. For example, while shown as a series of steps, various steps in FIG. 8 may overlap, occur in parallel, occur in a different order, or occur any number of times (including zero times). Also, while the method 800 is described as defining and reconstructing one plane in the focus region, the method 800 may be duplicated or repeatedly used in order to define and reconstruct a plurality of planes as appropriate.

It should be noted that the functions shown in or described with respect to FIGS. 2 through 8 can be implemented in an electronic device 101, 102, 104, server 106, or other device(s) in any suitable manner. For example, in some embodiments, at least some of the functions shown in or described with respect to FIGS. 2 through 8 can be implemented or supported using one or more software applications or other software instructions that are executed by the processor 120 of the electronic device 101, 102, 104, server 106, or other device(s). In other embodiments, at least some of the functions shown in or described with respect to FIGS. 2 through 8 can be implemented or supported using dedicated hardware components. In general, the functions shown in or described with respect to FIGS. 2 through 8 can be performed using any suitable hardware or any suitable combination of hardware and software/firmware instructions. Also, the functions shown in or described with respect to FIGS. 2 through 8 can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

obtaining, using a plurality of sensors of an electronic device, an image frame of a scene and data associated with the image frame, the data comprising user eye behavior data;

identifying, using at least one processing device of the electronic device, a focus region in the image frame based on the user eye behavior data;

reconstructing, using the at least one processing device, a plane in the focus region;

performing, using the at least one processing device, a planar reprojection using the reconstructed plane and a predicted head pose of a user to generate a modified image frame; and rendering, using the at least one processing device, an image for display based on the modified image frame;

wherein performing the planar reprojection comprises:

identifying a surface normal and an origin of a reprojection plane;

identifying a depth of the reprojection plane using the surface normal and the origin;

identifying a homography transformation matrix;

mapping image data in the image frame onto the reprojection plane using the homography transformation matrix to generate mapped image data; and adjusting the mapped image data based on the predicted head pose of the user to generate the modified image frame.

2. The method of claim 1, wherein identifying the focus region comprises:

identifying a focus point of the user based on the user eye behavior data;

identifying an interpupillary distance (IPD) of the user and an eye gaze vector for each eye of the user;

identifying an eye vergence angle based on the eye gaze vectors; and determining a focus region size based on the eye vergence angle and a focal distance between the focus point and a midpoint of the IPD.

3. The method of claim 1, wherein reconstructing the plane comprises:

determining whether a depth map associated with the image frame is available; and reconstructing the plane based on the depth map in response to a determination that the depth map for the focus region is available or reconstructing the plane based on object detection data in response to a determination that the depth map is not available.

4. The method of claim 3, wherein reconstructing the plane based on the depth map comprises:

reducing noise in depth data of the depth map to generate a noise-reduced depth map;

performing depth densification of the noise-reduced depth map to generate a densified depth map;

increasing resolution of the densified depth map to generate a resolution-enhanced depth map;

generating at least one three-dimensional (3D) point cloud using the resolution-enhanced depth map;

reconstructing the plane using the at least one 3D point cloud;

defining the reconstructed plane as the reprojection plane; and measuring the surface normal and the origin of the reprojection plane.

5. The method of claim 4, wherein defining the reconstructed plane as the reprojection plane comprises:

defining a plane model having model parameters based on a portion of the at least one 3D point cloud;

determining whether the plane model satisfies a threshold;

in response to a determination that the plane model does not satisfy the threshold, updating the plane model with a different portion of the at least one 3D point cloud until the updated plane model satisfies the threshold;

in response to a determination that the plane model or the updated plane model satisfies the threshold, determining whether the reconstructed plane is suitable for the planar reprojection;

in response to a determination that the reconstructed plane is suitable for the planar reprojection, identifying the reconstructed plane in the focus region as the reprojection plane; and in response to a determination that the reconstructed plane is not suitable for the planar reprojection, selecting a default plane as the reprojection plane.

6. The method of claim 3, wherein reconstructing the plane comprises:

detecting one or more objects in the focus region;

determining whether a plane is associated with the one or more objects;

in response to a determination that the plane is detected, identifying the plane as the reprojection plane in the focus region;

in response to a determination that the plane is not detected, selecting a default plane as the reprojection plane based on a position of each of the one or more objects; and measuring the surface normal and the origin of the reprojection plane.

7. The method of claim 1, further comprising:

applying a transformation to the modified image frame in order to generate a transformed image frame;

wherein rendering the image for display comprises rendering the transformed image frame.

8. An apparatus comprising:

a plurality of sensors configured to obtain an image frame of a scene and data associated with the image frame, the data comprising user eye behavior data; and at least one processing device configured to:

identify a focus region in the image frame based on the user eye behavior data;

reconstruct a plane in the focus region;

perform a planar reprojection using the reconstructed plane and a predicted head pose of a user to generate a modified image frame; and render an image for display based on the modified image frame;

wherein, to reconstruct the plane, the at least one processing device is configured to:

detect one or more objects in the focus region;

determine whether a plane is associated with the one or more objects;

in response to a determination that the plane is detected, identify the plane as a reprojection plane in the focus region;

in response to a determination that the plane is not detected, select a default plane as the reprojection plane based on a position of each of the one or more objects; and measure a surface normal and an origin of the reprojection plane.

9. The apparatus of claim 8, wherein, to define the focus region, the at least one processing device is configured to:

identify a focus point of the user based on the user eye behavior data;

identify an interpupillary distance (IPD) of the user and an eye gaze vector for each eye of the user;

identify an eye vergence angle based on the eye gaze vectors; and determine a focus region size based on the eye vergence angle and a focal distance between the focus point and a midpoint of the IPD.

10. The apparatus of claim 8, wherein, to reconstruct the plane, the at least one processing device is configured to:

determine whether a depth map associated with the image frame is available; and reconstruct the plane based on the depth map in response to a determination that the depth map for the focus region is available or reconstruct the plane based on object detection data in response to a determination that the depth map is not available.

11. The apparatus of claim 10, wherein, to reconstruct the plane based on the depth map, the at least one processing device is configured to:

reduce noise in depth data of the depth map to generate a noise-reduced depth map;

perform depth densification of the noise-reduced depth map to generate a densified depth map;

increase resolution of the densified depth map to generate a resolution-enhanced depth map;

generate at least one three-dimensional (3D) point cloud using the resolution-enhanced depth map;

reconstruct the plane using the at least one 3D point cloud;

define the reconstructed plane as the reprojection plane; and measure the surface normal and the origin of the reprojection plane.

12. The apparatus of claim 11, wherein, to define the reconstructed plane as the reprojection plane, the at least one processing device is configured to:

define a plane model having model parameters based on a portion of the at least one 3D point cloud;

determine whether the plane model satisfies a threshold;

in response to a determination that the plane model does not satisfy the threshold, update the plane model with a different portion of the at least one 3D point cloud until the updated plane model satisfies the threshold;

in response to a determination that the plane model or the updated plane model satisfies the threshold, determine whether the reconstructed plane is suitable for the planar reprojection;

in response to a determination that the reconstructed plane is suitable for the planar reprojection, identify the reconstructed plane in the focus region as the reprojection plane; and in response to a determination that the reconstructed plane is not suitable for the planar reprojection, select a default plane as the reprojection plane.

13. The apparatus of claim 8, wherein, to perform the planar reprojection, the at least one processing device is configured to:

identify the surface normal and the origin of the reprojection plane;

identify a depth of the reprojection plane using the surface normal and the origin;

identify a homography transformation matrix;

map image data in the image frame onto the reprojection plane using the homography transformation matrix to generate mapped image data; and adjust the mapped image data based on the predicted head pose of the user to generate the modified image frame.

14. A non-transitory machine readable medium containing instructions that when executed cause at least one processor of an electronic device to:

obtain an image frame of a scene and data associated with the image frame, the data comprising user eye behavior data;

identify a focus region in the image frame based on the user eye behavior data;

reconstruct a plane in the focus region;

perform a planar reprojection using the reconstructed plane and a predicted head pose of a user to generate a modified image frame; and render an image for display based on the modified image frame;

wherein the instructions that when executed cause the at least one processor to identify the focus region comprise instructions that when executed cause the at least one processor to:

identify a focus point of the user based on the user eye behavior data;

identify an interpupillary distance (IPD) of the user and an eye gaze vector for each eye of the user;

identify an eye vergence angle between the eye gaze vectors at the focus point; and determine a focus region size based on the eye vergence angle and a focal distance between the focus point and a midpoint of the IPD.

15. The non-transitory machine readable medium of claim 14, wherein the instructions that when executed cause the at least one processor to reconstruct the plane comprise instructions that when executed cause the at least one processor to:

determine whether a depth map associated with the image frame is available; and reconstruct the plane based on the depth map in response to a determination that the depth map for the focus region is available or reconstruct the plane based on object detection data in response to a determination that the depth map is not available.

16. The non-transitory machine readable medium of claim 15, wherein the instructions that when executed cause the at least one processor to reconstruct the plane based on the depth map comprise instructions that when executed cause the at least one processor to:

reduce noise in depth data of the depth map to generate a noise-reduced depth map;

perform depth densification of the noise-reduced depth map to generate a densified depth map;

increase resolution of the densified depth map to generate a resolution-enhanced depth map;

generate at least one three-dimensional (3D) point cloud using the resolution-enhanced depth map;

reconstruct the plane using the at least one 3D point cloud;

define the reconstructed plane as a reprojection plane; and measure a surface normal and an origin of the reprojection plane.

17. The non-transitory machine readable medium of claim 16, wherein the instructions that when executed cause the at least one processor to define the reconstructed plane as the reprojection plane comprise instructions that when executed cause the at least one processor to:

define a plane model having model parameters based on a portion of the at least one 3D point cloud;

determine whether the plane model satisfies a threshold;

in response to a determination that the plane model does not satisfy the threshold, update the plane model with a different portion of the at least one 3D point cloud until the updated plane model satisfies the threshold;

in response to a determination that the plane model or the updated plane model satisfies the threshold, determine whether the reconstructed plane is suitable for the planar reprojection;

in response to a determination that the reconstructed plane is suitable for the planar reprojection, identify the reconstructed plane in the focus region as the reprojection plane; and in response to a determination that the reconstructed plane is not suitable for the planar reprojection, select a default plane as the reprojection plane.

18. The non-transitory machine readable medium of claim 15, wherein the instructions that when executed cause the at least one processor to reconstruct the plane comprise instructions that when executed cause the at least one processor to:

detect one or more objects in the focus region;

determine whether a plane is associated with the one or more objects;

in response to a determination that the plane is detected, identify the plane as a reprojection plane in the focus region;

in response to a determination that the plane is not detected, select a default plane as the reprojection plane based on a position of each of the one or more objects; and measure a surface normal and an origin of the reprojection plane.

19. The non-transitory machine readable medium of claim 14, wherein the instructions that when executed cause the at least one processor to:

apply transformation to the modified image frame in order to generate a transformed image frame;

wherein to render the image for display the at least one processor renders the transformed image frame.

20. The non-transitory machine readable medium of claim 14, wherein the instructions that when executed cause the at least one processor to perform a planar reprojection comprise instructions that when executed cause the at least one processor to:

identify a surface normal and an origin of a reprojection plane;

identify a depth of the reprojection plane using the surface normal and the origin;

identify a homography transformation matrix;

map image data in the image frame onto the reprojection plane using the homography transformation matrix to generate mapped image data; and adjust the mapped image data based on the predicted head pose of the user to generate the modified image frame.

* * * * *